UNITED STATES PATENT OFFICE 2,253,128

COMPOUNDS OF GROUP IV-B ELEMENTS WITH ALPHA-BETA UNSATURATED ACIDS

Carl Martin Langkammerer, Wilmington, Del., assignor to E. I. du Pont de Nemours & Company, Wilmington, Del., a corporation of Delaware No Drawing. Application April 26, 1939, Serial No. 270,240

8 Claims. (Cl. 260—84)

This invention relates to compounds of unsaturated organic acids with inorganic elements of group IV-B of the periodic classification.

Compounds of organic acids with the group IV-B inorganic elements, silicon, germanium, tin, and lead, these elements being in their tetravalent state, are rare and, for some of the elements, hitherto non-existent. Compounds of alpha-beta unsaturated organic acids with tetravalent silicon, germanium, tin and lead are hitherto unknown. The preparation of compounds of the tetravalent elements by reaction of a metal salt of an organic acid with a halide of germanium, tin, lead or silicon has not hitherto been accomplished, the reaction of silicon chloride with alkali metal acetate leading to acetic anhydride, silica and alkali metal halide (Montanna, J. Am. Chem. Soc. 49, 2114-6 (1927) or to acetyl chloride, silica and alkali metal halide (Rauter Ann. 270 260 (1892)).

This invention has as an object the provision of a new process for the preparation of compounds of alpha-beta unsaturated organic acids with tetravalent inorganic elements of group IV-B and especially for the preparation of compounds of alpha-methylene monocarboxylic acids with tetravalent inorganic elements of group IV-B. A further object is the provision of a new class of compounds. Another object is the provision of a new class of polymeric materials. A further object is the provision of new interpolymers. A still further object is the provision of new casting compositions. Other objects will appear hereinafter.

These objects are accomplished by the following invention wherein an alkali metal salt of an alpha-beta unsaturated acid, preferably an alpha-methylene monocarboxylic acid is reacted with a halide of an inorganic element of group IV-B of the periodic system, said element being in its tetravalent state, the reaction product being a compound of a tetravalent inorganic element with an alpha-beta unsaturated acid, in the preferred class an alpha-methylene monocarboxylic acid, which compound is then polymerized or interpolymerized to useful polymeric products.

The nature of the reaction involved in the formation of the monomeric compounds is illustrated by the following equation:

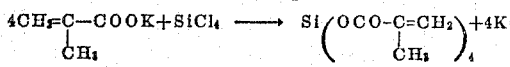

While the above equation resembles an ionic metathesis, it is not such since neither of the silicon compounds is a salt. The compounds formed may be described by the following generic formula:

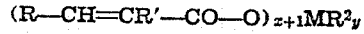

in which M=an inorganic element of group IV-B, i. e. one having an atomic weight of more than 28, M being in the tetravalent state.

R=hydrogen or a monovalent hydrocarbon radical, e. g., alkyl, aryl, alicyclic, aralkyl;

$R^2$=hydrogen or a monovalent hydrocarbon radical, e. g., alkyl, aryl, alicyclic, aralkyl;

$R^1$ is hydrogen, halogen or a monovalent hydrocarbon radical, e. g., alkyl, aryl, aralkyl, alicyclic;

$x+y=3$ and $x$ is any integral value from 0 to 3.

The more detailed practice of the invention is illustrated by the following examples, wherein parts given are by weight. There are of course many forms of the invention other than these specific embodiments.

Example I

To a stirred suspension of 99.2 parts of potassium methacrylate in 135 parts of benzene is added 34 parts of silicon tetrachloride dissolved in 68 parts of benzene over a period of 45 minutes. The character of the insoluble material changes slowly and after the silicon tetrachloride solution has been added the reaction mixture is stirred and refluxed gently for one hour. The solid is filtered off and discarded. The benzene is removed from the filtrate by evaporation in a vacuum and on cooling the remaining liquid solidifies to a hard white cake weighing 59 parts. Purified by recrystallizing from petroleum ether the product, silicon tetramethacrylate, melts at 73-75° C.

On heating for four hours at 100° C. silicon tetramethacrylate polymerizes to a clear, brittle, insoluble, infusible resin. The addition of 0.1 per cent of benzoyl peroxide accelerates the reaction so that polymerization occurs after 15 minutes at 65° C.

A solution comprising 9.5 parts of monomeric styrene, 0.5 part silicon tetramethacrylate and 0.1 part benzoyl peroxide is allowed to stand for 24 hours at 65° C. The polymer obtained softens at 100° C. Polymers containing 1 and 10 per cent of silicon tetramethacrylate soften at 91° C. and 109° C., respectively, as compared with 86° C. for polystyrene similarly prepared. Aside from the advantage of higher softening points, these interpolymers are resistant to the action of organic solvents, such as benzene and toluene, which readily dissolve polystyrene. The interpolymers can be molded at temperatures slightly higher than those required for polystyrene. Molding, however, becomes more difficult with higher percentages of silicon tetramethacrylate.

A solution comprising nine parts of monomeric methyl methacrylate, one part of silicon tetramethacrylate and 0.1 part of benzoyl peroxide is allowed to stand for 24 hours at 65° C. The clear colorless polymer is not dissolved by solvents for unmodified polymethyl methacrylate, e. g., toluene, dioxan, etc. The corresponding interpolymers containing smaller amounts of silicon tetramethacrylate, such as 1 and 5 per cent, respectively, likewise are resistant to the action of these solvents.

*Example II*

A mixture of 24 parts of potassium methacrylate suspended in 180 parts of benzene and 40 parts of trimethyltin chloride dissolved in 90 parts of benzene is refluxed on a steam bath for 3–4 hours. By the end of this time the texture of the precipitate has changed. The solid is filtered off and the benzene removed from the filtrate by distillation. Purification of the residue by recrystallization from petroleum solvent and vacuum sublimation produces long white needles of trimethyltin methacrylate melting at about 100° C.

Valuable interpolymers of trimethyltin methacrylate with organic compound containing a methylene ($CH_2$) group attached by an ethylenic double bond to a carbon atom which is in turn attached to at least one negative group, such as styrene and methyl methacrylate, are easily prepared particularly in the presence of peroxide-type catalysts. The interpolymers are clear, hard, tough, water-white resins.

*Example III*

To a stirred suspension of 62.0 parts of potassium methacrylate in 180 parts of benzene is added a solution of 32.5 parts of stannic chloride in 90 parts of benzene. The reaction becomes warm during the addition of the stannic chloride and stirring is continued for 20 minutes after all has been added. The solid is removed by centrifuging and the clear liquid is evaporated in vacuo to 100 parts. Addition of 63 parts of petroleum ether causes the precipitation of 25 parts of white, crystalline tin tetramethacrylate. This material decomposes without melting at about 173° C. Interpolymers of tin tetramethacrylate with styrene and methyl methacrylate may be prepared. Interpolymers containing as little as 5% of tin tetramethacrylate are insoluble in the usual solvents for styrene and methyl methacrylate. The interpolymers with styrene have the added advantage of a higher softening point than unmodified polystyrene. The 10% tin tetramethacrylate–90% styrene interpolymer, e. g., softens at 94° C.

This invention includes in its scope and is generic to monomers, polymers and interpolymers of compounds of alpha, beta-unsaturated monocarboxylic acids with inorganic tetravalent elements of group IV-B. The alpha-methylene monocarboxylic acid compounds and especially the silicon and tin compounds are preferred because of ready availability and ease with which they polymerize. Likewise, the methacryloxy compounds are preferred because of greatest technical interest. Any tetravalent silicon, germanium, tin and lead halides, or, more accurately, halanhydride, may be used including stannic chloride, trimethyltin chloride, silicon fluoride, plumbic chloride, silicochloroform, tricyclohexyltin chloride, tri-p-xylyltin bromide, tribenzyltin chloride, tripropyltin iodide, dimethyltin dichloride, diphenyltin chlorobromide, methyltin tribromide, trimethyllead bromide, dimethyllead dibromide, triphenyllead bromide, methylethyllead dichloride, triphenylgermanium bromide.

The tetravalent group IV-B halide may be reacted with any alkali metal or any alkaline earth metal salt of any alpha-beta unsaturated but preferably alpha-methylene, monocarboxylic acid, including sodium, potassium, lithium, calcium, barium, strontium, etc. salts of methacrylic, acrylic, alpha-chloroacrylic, alpha-phenylacrylic, crotonic, tiglic, cinnamic, alpha-chlorocrotonic, angelic, alpha-ethylcrotonic, alpha-butylacrylic, alpha-octylacrylic, etc., acids.

The appropriate salt of the alpha-beta unsaturated monocarboxylic acid is reacted with the halide of the tetravalent inorganic group IV-B element, preferably in the presence of an inert solvent, e. g., a hydrocarbon such as toluene, xylene, benzene, etc. Solvents containing active hydrogen such as amines, alcohols, organic acids, etc., are generally not suitable. The use of an excess of the tetravalent element halide tends to the formation of the type $(R-CO_2)_xMCl_{4-x}$. Temperatures from those at which the reaction is sufficiently fast to be evident, e. g. 20° C., up to those at which decomposition takes place, which may happen at 150° C., may be employed.

The products have the general formula $$(R-CH=CR'-CO-O)_{x+1}MR^2_y$$

in which M=silicon, germanium, tin or lead;

R is hydrogen or a monovalent hydrocarbon radical, e. g., alkyl, aryl, aralkyl, alicyclic;

$R^1$ is hydrogen, halogen or a monovalent hydrocarbon radical, e. g., alkyl, aryl, aralkyl, alicyclic;

$R^2$ is hydrogen or a monovalent hydrocarbon radical, e. g., alkyl, aryl, aralkyl, alicyclic;

$x+y=3$, $x$ being an integral number from 0 to 3.

The monomeric products of the present invention may be polymerized to insoluble and infusible polymers. While the polymerization may be conducted without catalysts, the use of the same is preferred because of the greater convenience of the catalysed process. As catalysts there may be employed any oxygen yielding catalysts including benzoyl peroxide, ascaridole, pinene peroxide, etc.

The products of the present invention can be interpolymerized with any polymerizable, organic compound containing a methylene ($CH_2$) group attached by an ethylenic double bond to a carbon atom which is in turn attached to at least one negative group, i. e., a compound wherein the radical

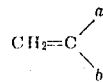

is attached (*a*) to a negative radical and (*b*) to hydrogen, halogen, or a hydrocarbon radical. The negative radical may be any negative radical including halogen and organic radicals containing a carbon atom joined to another atom by a plural bond, the carbon atom being removed from the vinylidene radical by not more than one atom. Exemplary vinylidene compounds are vinyl esters, ethers, ketones, e. g., vinyl acetate, vinyl phenyl ether, methyl vinyl ketone; aryl vinyl compounds where the vinyl group is directly attached to the nuclear carbon, e. g., styrene, alpha-methylene monocarboxylic acids, their esters, amides, and nitriles, e. g., acrylic acid, methacrylic acid, methyl acrylate, methyl methacrylate, methacrylamide, methacrylonitrile, and the like.

In the preparation of cast articles by bulk interpolymerization of a silicon, germanium, tin or lead compound of an alpha, beta-unsaturated and preferably alpha-methylene monocarboxylic acid with a polymerizable organic compound containing a methylene (CH₂) group attached by an ethylenic double bond to a carbon atom which is in turn attached to at least one negative group a wide range of proportions may be used depending on the particular use to which the cast interpolymer is to be put. Concentration up to 20% of the germanium, tin, lead or silicon derivative are preferred because of their particular properties. For example, such interpolymers are particularly homogeneous.

Polymerization including also interpolymerization may be carried out in emulsion or suspension in non-aqueous non-solvents for the monomer, in solution in solvents for the monomer which are non-solvents for the polymer, at atmospheric, subatmospheric and superatmospheric pressure. The polymerization can be carried out at temperatures from 25° C. to 150° C. The polymerization at lower temperatures is, however, so slow that for practical purposes the polymerization would not be carried out at such temperatures without the aid of catalysts.

Polymerization may be effected while the monomeric ester is suspended in a finely divided state in a suitable liquid medium which is a non-solvent therefor, e. g., petroleum ether, and the suspension agitated throughout the whole period of polymerization in order to avoid agglomeration of the individual droplets as far as possible. Although the addition of dispersing agents is desirable, in adidtion to stirring, to prevent agglomeration, it is preferable to carry out the process without these agents.

The compounds of this invention may be polymerized alone or in admixture with a polymerizable negatively substituted compound as above defined to produce polymers or interpolymers.

An alternative process for carrying out the polymerization consists in dissolving the monomer in a suitable solvent therefor which is a non-solvent for the polymer, e. g., benzene.

The polymers and interpolymers of the present invention may be used in the preparation of cast or molded articles. By incorporation of even small amounts of polymers of compounds of group IV-B tetravalent inorganic elements with alpha,beta-unsaturated, and preferably alpha-methylene, monocarboxylic acids, the properties of other resins may be desirably modified. Thus, resins can be insolubilized, their melting points increased, and their rate of polymerization accelerated, by the addition of these agents.

Silicon tetramethacrylate added to methyl methacrylate or styrene accelerates the polymerization of these materials. In addition the styrene interpolymers have a considerably higher softening point than unmodified polymeric styrene. In general, the effects of tin tetramethacrylate on methyl methacrylate and styrene polymers are similar to those of silicon tetramethacrylate. The interpolymers of methyl methacrylate and styrene with trimethyltin methacrylate, on the other hand, are soluble in organic solvents and can be employed as coating materials, in making films and in impregnating porous materials.

The above description and examples are intended to be illustrative only. Any modification of or variation therefrom which conforms to the spirit of the invention is intended to be included within the scope of the claims.

I claim:

1. A compound of the formula $$(R-CH=CR'-CO-O)_{x+1}MR^2_y$$

wherein M is an element of group IV-B of the periodic system, R is a member of the class consisting of hydrogen and monovalent hydrocarbon radicals, R' is selected from the class consisting of hydrogen, halogen and monovalent hydrocarbon radicals, R² is selected from the class consisting of hydrogen and monovalent hydrocarbon radicals, $x$ is an integral number from 0 to 3 and $x+y$ equals 3.

2. A compound wherein at least one valence of a group IV-B element in the tetravalent state is satisfied by the radical of an alpha-methylene monocarboxylic acid, the remaining valences of said group IV-B element being satisfied by members of the class consisting of hydrogen and monovalent hydrocarbon radicals.

3. A compound wherein at least one valence of silicon in the tetravalent state is satisfied by the radical of an alpha-methylene monocarboxylic acid, the remaining valences of the silicon being satisfied by members of the class consisting of hydrogen and monovalent hydrocarbon radicals.

4. A compound wherein at least one valence of tin in the tetravalent state is satisfied by the radical of an alpha-methylene monocarboxylic acid, the remaining valences of the tin being satisfied by members of the class consisting of hydrogen and monovalent hydrocarbon radicals.

5. Silicon methacrylate.

6. Stannic methacrylate.

7. A polymer of a compound wherein at least one valence of a group IV-B element in the tetravalent state is satisfied by the radical of an alpha-methylene monocarboxylic acid, the remaining valences of said group IV-B element being satisfied by the members of the class consisting of hydrogen and monovalent hydrocarbon radicals.

8. An interpolymer of a compound wherein at least one valence of a group IV-B element in the tetravalent state is satisfied by the radical of an alpha-methylene monocarboxylic acid, the remaining valences of said group IV-B element being satisfied by members of the class consisting of hydrogen and monovalent hydrocarbon radicals, with a polymerizable organic compound containing a methylene (CH₂) group attached by an ethylenic double bond to a carbon atom which is in turn attached to at least one negative group.

CARL MARTIN LANGKAMMERER.